J. A. VIKTOR & F. J. JOHN.
DIPPING TANK.
APPLICATION FILED FEB. 4, 1909.
933,935.
Patented Sept. 14, 1909.
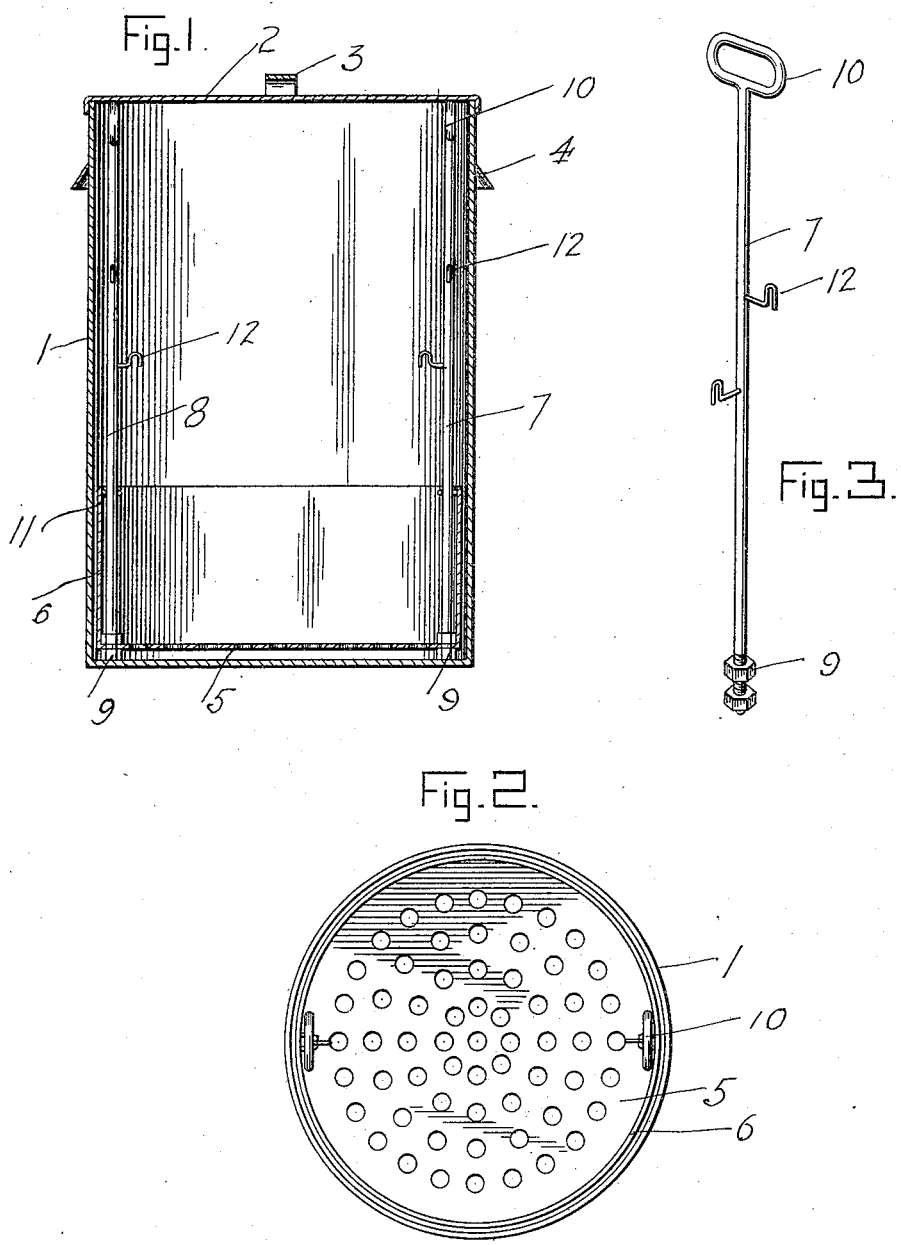

UNITED STATES PATENT OFFICE.

JOHN A. VIKTOR AND FRANK J. JOHN, OF CEDAR RAPIDS, IOWA.

DIPPING-TANK.

933,935. Specification of Letters Patent. Patented Sept. 14, 1909.

Application filed February 4, 1909. Serial No. 476,041.

*To all whom it may concern:*

Be it known that we, JOHN A. VIKTOR and FRANK J. JOHN, citizens of the United States of America, residing at Cedar Rapids, in the county of Linn and State of Iowa, have invented certain new and useful Improvements in Dipping-Tanks, of which the following is a specification, reference being had therein to the accompanying drawing.

This invention relates to dipping tanks, designed primarily for the oiling of harness, and the object thereof is to provide means in a manner as hereinafter set forth for conveniently oiling a set or the elements of a set of harness and when necessary after the oiling operation, to suspend the articles oiled so that the superfluous oil can drip off.

Further objects of the invention are to provide a dipping tank for oiling harness which shall be simple in its construction, strong, durable, efficient in its use, conveniently used and inexpensive to manufacture.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations, and modifications can be resorted to which come within the scope of the claim hereunto appended.

In the drawings, wherein like reference characters denote corresponding parts throughout the several views, Figure 1 is a vertical sectional view of a dipping tank in accordance with this invention. Fig. 2 is a top plan with the cover removed, and, Fig. 3 is a detail in perspective showing the form of handle bar.

Referring to the drawings by reference characters, 1 denotes a tank closed by a removable cover 2 provided with a handle 3. The tank 1 is also provided with handles as at 4 so that the tank can be conveniently moved from point to point. The tank 1 is adapted to contain a body of oil in which is immersed the harness for the purpose of oiling the latter.

Arranged within the tank 1 is a vertically movable basket having a perforated bottom 5 and an imperforate side 6, the basket being open at its top and is adapted to contain the harness when immersed in the oil within the tank. The basket is vertically movable and for such purpose a pair of handle bars 7, 8, are provided, these bars at their lower ends extending through the bottom 5 and are connected thereto by the nuts 9. The lower ends of the handle bars 7 and 8 are screw-threaded for the reception of the nuts 9. The connections between the lower ends of the handle bars 7, 8, and the bottom are such as to be what is termed a swivel connection to allow of the turning of the handle bars for a purpose to be hereinafter referred to. The handle bars 7, 8, extend up through the basket and are of a length as to terminate in close proximity to the top edge of the tank 1 and the upper ends of each of the bars 7, 8, are formed with a handle 10. To maintain the handle bars 7, 8, perpendicular, the side 6 of the basket is formed with a pair of diametrically opposite clips 11 which surround the handle bars and maintain them perpendicular as is evident.

To provide for the suspending of the basket within the tank 1 so that the superfluous oil can be dripped from the harness when occasion so requires, each of the handle bars is provided with a pair of hooks 12 which project at right angles with respect to the bar and at right angles with respect to each other. The hooks 12 are adapted to engage with the top edge of the tank 1 whereby the basket is suspended within the tank to allow of the superfluous oil dripping off the harness. The hooks 12 are arranged in pairs so that a pair thereof can engage the top edge of the tank for the purpose of suspending the basket. As the handle bars are swively connected to the bottom 5 of the basket, they can be turned so that the hooks will be positioned to engage with the top edge of the tank to suspend the basket.

When using the device, the tank 1 is filled with a suitable quantity of oil and the article to be oiled placed within the basket, the latter having been elevated for the purpose of receiving the article. The basket is then lowered within the tank so that the article can be immersed in the oil, after which the basket is elevated and suspended through the medium of a pair of hooks 12 upon the tank 1 so that the superfluous oil can drip from the article.

Although the invention is designed primarily for the purpose of oiling a harness, yet it is to be understood that it is adapted for use for any purpose wherein it is found applicable.

What we claim is:

In combination a tank, a basket mounted therein and provided with a perforated bottom, handle-bars extending through the perimeter of said bottom at diametrically opposite points, means for swivelly connecting the lower ends of the handle-bars to the bottom of the tank, each of said bars provided with a handle at its upper end, a plurality of hooks carried by each of the bars, the hooks of each bar extending at right angles with respect to their respective bar, the hooks of each bar extending at right angles with respect to each other, the hooks of one bar arranged in alinement with respect to the hooks of the other bar and the angular disposition of the hooks of one bar being the same as that of the hooks of the other bar, the hooks of said bars constituting means for suspending the basket upon the top edge of the tank, and clips disposed at right angles with respect to the inner face of said basket at the top thereof and permanently engaging said bars for maintaining them perpendicular.

In testimony whereof we affix our signatures in the presence of two witnesses.

JOHN A. VIKTOR.
FRANK J. JOHN.

Witnesses:
 FRANK C. WELCH,
 JOHN M. ELY.